United States Patent
Schuh et al.

(10) Patent No.: US 6,624,115 B2
(45) Date of Patent: Sep. 23, 2003

(54) COATED PRODUCTS

(75) Inventors: Lothar Schuh, Plankstadt (DE); Heidemarie Gutzeit, Heidelberg (DE); Philipp Herschel, Viernheim (DE)

(73) Assignee: ABB Lummus Global, Inc., Bloomfield, NJ (US)

( * ) Notice: Subject to any disclaimer, the term of this patent is extended or adjusted under 35 U.S.C. 154(b) by 369 days.

(21) Appl. No.: 09/797,082

(22) Filed: Mar. 1, 2001

(65) Prior Publication Data

US 2002/0005355 A1 Jan. 17, 2002

Related U.S. Application Data

(63) Continuation of application No. 09/156,023, filed on Sep. 17, 1998, now Pat. No. 6,217,732.
(60) Provisional application No. 60/097,483, filed on Aug. 21, 1998, and provisional application No. 60/059,795, filed on Sep. 23, 1997.

(51) Int. Cl.[7] .............................................. B01J 21/04
(52) U.S. Cl. ...................... 502/439; 502/349; 502/355
(58) Field of Search ................................ 502/439, 349, 502/355, 300

(56) References Cited

U.S. PATENT DOCUMENTS 4,175,153 A * 11/1979 Dobo et al. .................. 428/398
5,723,403 A     3/1998 Durand et al. ............... 502/304

* cited by examiner

*Primary Examiner*—Stanley S. Silverman
*Assistant Examiner*—Edward M. Johnson
(74) *Attorney, Agent, or Firm*—Elliot M. Olstein; Raymond J. Lillie

(57) ABSTRACT

A product comprised of a three dimensional network of material is coated with a particulate support. The coating may be applied by an electrophoretic coating procedure to apply a particulate coating on the surface or into the interior portions of such three dimensional network of material. In one embodiment, the particles are a catalyst or a catalyst precursor or a catalyst support to thereby provide a catalyst structure in which catalyst may be supported as a coating in the interior and on the exterior of a three-dimensional network of material having a high void volume. Edge effects may be reduced by control or disruption of field lines during the coating. In addition, larger particles may be electrophoretically coated onto a product by the use of smaller particles which function as a "glue".

18 Claims, 3 Drawing Sheets

COATED PRODUCTS

This is a Continuation of application Ser. No. 09/156,023 filed Sep. 17, 1998, now U.S. Pat. No. 6,217,732, which is based on U.S. Provisional Application No. 60/059,795, filed Sep. 23, 1997 and U.S. Provisional Application No. 60/097,483, filed Aug. 21, 1998, upon which this application claims priority.

This Application claims the priority of U.S. Provisional Application Ser. No. 60/059,795 filed Sep. 23, 1997 and U.S. Provisional Application Ser. No. 60/097,483 filed on Aug. 21, 1998.

The invention relates to coated products and the production thereof. The invention also relates to electrophoretic coating and to products produced thereby. This invention further relates to providing a more uniform coating by the use of electrophoretic coating or deposition. In a particular aspect, the present invention relates to the production of a coated three-dimensional network of material in which interior and exterior portions of the material are coated. The invention further relates to a coated catalyst structure wherein the structure is formed from a plurality of layers of fibers that are coated with a particulate coating that includes a catalyst.

There is a wide variety of technologies available for providing coated materials. One such method involves coating of materials by spraying or dipping. Attempts to employ such technology for coating a three dimensional network of material generally resulted in a coated product wherein only a portion of the interior of the material is coated.

Another coating procedure which is known in the art is electrophoretic coating. Such electrophoretic coating has generally been applied only to dense bodies or surfaces.

In addition, in electrophoretic coating procedures, in many cases, difficulties are encountered in providing a coating in which the thickness of the coating at the edges of the material is essentially the same as the coating thickness in other portions of the material.

In accordance with one aspect of the present invention, there is provided a process for depositing particles, as a coating, on a product or support comprised of a three dimensional network of material, with the particles being applied to such a product or support by an electrophoretic coating procedure.

Applicant has found that by electrophoretic coating of a porous product or support comprised of a three-dimensional network of material, such porous product or support can be effectively coated with a particulate coating with or without penetration of the coating into the interior of the porous product or support, preferably with penetration and that the degree of penetration can be controlled. Such three dimensional network of material is preferably formed from a plurality of layers of fibers that are randomly oriented.

Moreover, it is possible to coat the interior of the porous product to obtain a uniform coating over a defined thickness of the porous product; however, the invention is not limited to achieving such a uniform coating; i.e., the porous product may have a non-uniform coating over a defined thickness. Although in a preferred embodiment a porous product is coated electrophoretically to produce a product having a particulate coating in which a defined thickness thereof is uniformly coated (the interior portion of the multilayered product is coated), the present invention is also applicable to producing a coated product in which there is no essential penetration into the interior of the product or in which there is a controlled penetration and in which the coating is not uniform.

Applicant has surprisingly found that contrary to expectations in the art, an electrophoretic coating procedure may be employed for depositing particles within the interior of a product comprised of a three dimensional network of material. Moreover, Applicant has surprisingly found that an electrophoretic coating procedure may be employed for depositing particles as a uniform coating for a defined thickness of the interior portion of such a three dimensional network.

By the use of electrophoretic coating, there is provided a coated porous product which differs from coated porous products produced by procedures previously employed in the art such as spray coating or dipping. For example, the use of the technique of the invention provides a more uniform coating, i.e., there is a lower variation in coating thickness over a defined thickness of the product. In addition, unlike the prior art procedures, at intersections of the material forming the three-dimensional network an excess buildup of coating material that blocks or closes pores can be reduced or eliminated. Furthermore, by a more uniform application of the coating, "blocking" or "closing" of pores is reduced and/or eliminated. In addition, over a defined thickness, by proceeding in accordance with the invention, "bare" or uncoated portions of material are reduced or eliminated.

Thus, in accordance with an aspect of the present invention, a product comprised of a three dimensional network of materials may be produced in which a defined thickness of the interior portion of the material is coated with the particles in a uniform manner. The defined thickness of the three dimensional network of material may be a portion of the overall thickness or may be the entire thickness of such three dimensional network.

In a preferred embodiment of this aspect of the invention, the coating comprised of particles forms a porous coating on both the exterior and the interior portion of the three dimensional network of material, which coating may be comprised of one, two or more layers of the deposited particles.

In accordance with another aspect of the present invention, there is provided a process and coated product wherein a non-particulate support is electrophoretically coated with particles that have an average particle size greater than 0.5 micron wherein such larger particles are electrophoretically coated onto the support in conjunction with smaller particles that have an average particle size less than 150 nanometers (such smaller particles can be in the form of a sol or colloid). Applicant has found that an electrophoretic coating of larger particles (particles of an average particle size of greater than 0.5 micron) may be applied more effectively if the coating bath employed in such electrophoretic coating process includes particles having an average particle size of less than 150 nanometers in addition to the larger particles.

Although applicant does not intend to be bound by any theoretical reasoning, it is believed that the smaller particles function to more effectively bind the larger particles to each other and/or to the support or product that is being coated. In effect, the smaller particles function as a "glue" to improve the adherence of the larger particles to each other and/or to the coated product or support and increase the mobility of the larger particles in the electric field.

In a particularly preferred embodiment, the larger particles that are to be coated onto the product or support are either a catalyst support, catalyst precursor, a catalyst, or a catalyst or catalyst precursor on a particulate support.

The smaller particles may be the same material as the larger particles or may be a different material.

In many cases, it is desirable to produce a catalyst system in which a catalyst in particle form (the particle form of the catalyst coated on the non-particulate support may be a particulate catalyst support coated or impregnated with a catalyst) is present as a coating on a non-particulate support in which the particulate catalyst, when supported on the non-particulate support, has an average particle size greater than 0.5 micron. In such cases, applicant has found that in using an electrophoretic process for coating particles of a catalyst or catalyst precursor or catalyst support (with or without a catalyst or catalyst precursor) onto a non-particulate solid support which catalyst, catalyst precursor or support has an average particle size greater than 0.5 micron, it is desirable that the electrophoretic coating bath that contains such larger particles also includes smaller particles (in the form of a sol or colloid) in an amount that provides for a coating of the larger particles onto the non-particulate support such that the coating of the larger particles effectively adheres to the non-particulate support. The smaller particles may be comprised of the same material as the larger particles or may be a different material or materials or may include the material of the larger particle plus a different material. As hereinabove indicated, it is believed that the smaller particles function as a "glue" that improves adherence of the larger particles to each other and/or the non-particulate support.

As hereinabove indicated the average particle size of the smaller particles is generally less than 150 nanometers. In general, the average particle size is at least 2 nanometers. For example, in one embodiment, the average particle size is from 20–40 nanometers.

The larger particles that are to be coated onto the non-particulate support generally have an average particle size of at least 0.5 micron for example, at least 1.0 micron. In general, the average particle size does not exceed 20 microns.

In the coating bath, the relative amounts of the larger and smaller particles are selected to achieve in the final coating the desired amount of larger particles and an amount of smaller particles that provides for effective adherence of the coating containing the larger particles to the non-particulate support. In general, based on the total amount of the larger and smaller particles, the amount of smaller particles used in the coating bath is from 0.1% to 10% by weight.

The aspect of the present invention wherein larger particles are electrophoretically coated onto a support is applicable to the electrophoretic coating of porous supports (three dimensional supports with a thickness wherein the coating is applied to both the exterior or interior of the support) as well as to electrophoretic coating of dense or non-porous supports wherein the coating is essentially only applied to the exterior of the support.

The product or support to which a coating of particles is applied by electrophoretic coating is one which is capable of accepting a charge. The product may be formed from only conductive materials or from a mixture of conductive and nonconductive materials, provided that the overall product is capable of accepting a charge. As representative examples of conductive materials which may be used alone or in combination for forming all or a portion of the product comprised of a three dimensional network of material, there may be mentioned metals, carbon as well as electrically conducting polymers and/or ceramics. As representative examples, of preferred metals there may be mentioned: stainless steel; Fe—Ni or Fe—Cr alloys; Fe—Cr—Al alloys; copper; nickel; brass; etc.

The product or support which is coated may be of the type described in U.S. Pat. Nos. 5,304,330; 5,080,962; 5,102,745 or 5,096,663.

The three dimensional network of materials may be one which is comprised of fibers or wires, such as a wire or fiber mesh, a metal felt or gauze, metal fiber filter or paper and the like, or may be a porous metal composite for example, formed from sintered porous metal powder. The compacted powder and/or wires or fiber define a three dimensional network of material which has a thickness thereto. In general, the thickness of the three dimensional network of material which contains the uniform coating is at least 5 microns, and generally does not exceed 10 mm. In accordance with a preferred embodiment, the thickness of the network which contains the uniform coating is at least 50 microns and more preferably at least 100 microns, and generally does not exceed 2 mm.

In general, when the product is a fibrous network of material, the thickness or diameter of the fiber is less than 500 microns, preferably less than 100 microns and more preferably less than 30 microns.

The product that is coated is preferably comprised of a plurality of layers of fibers that are randomly oriented in the layers, and in accordance with the invention, the fibers in the interior as well on the exterior of the product are coated with a particulate coating to form a porous coating.

The particles which are applied to the three-dimensional network of material, as a coating, by an electrophoretic coating process, generally have an average particle size which does not exceed 100 microns, and in most cases does not exceed 10 microns. In general, the particle size of such particles is at least 1 nanometer, and preferably at least 2 nanometers. The particles may be colloidal particles or mixtures of colloidal particles and/or mixtures of colloidal particles with one or more particles which are not colloidal particles.

The thickness of the formed coating may vary. In general, the thickness is at least 1 micron and in general no greater than 100 microns.

The particles that are to be coated onto the support may be comprised of a single material or multiple materials (two, three or more different materials). For example, the material may be a complex of two or more materials, such as an ionic or absorbed complex.

The interior portion of the product that is coated in accordance with the invention has a porosity which is sufficient to allow the particles which comprise the coating to penetrate or migrate into the three dimensional network. Thus, the pore size of the three dimensional material and the particle size of the particles comprising the coating, in effect, determine the distance to which the particles penetrate into and coat the interior of the three dimensional network of material and/or the coating thickness in the network. The larger the pore sizes the greater the thickness of the coating which can be uniformly coated in accordance with the invention. In general, the average void opening of the product which is coated is at least 10 microns and preferably at least 20 microns, preferably the total void volume is 60–90% (void volume percent is the ratio of open volume to total volume multiplied by 100). Thus, by coordinating particle size and the pore size of the product to be coated, it is possible to control the penetration or migration of the coating into the interior of the porous product,e.g., by varying the pore size of the material to be coated.

The product or support which is coated may have different pore sizes over the thickness thereof, and within the scope of the invention, it is contemplated that the three dimensional product which is coated will have a uniform porosity throughout or that its porosity will vary and that such product may be a laminated and/or comprised of the same or different materials and/or may have multi-layers. The material forming the three-dimensional network which is to be electrophoretically coated may be coated or uncoated and such three-dimensional network may have particles entrapped or contained therein. In general, such particles, if present, have a size of from 1–300 microns.

The particulate material which is used as the coating may be comprised of a single material or a mixture of materials and when a mixture is used, the particles may be a composite comprised of smaller particles (a sol) which adheres to larger particles.

The selection of the materials and the size thereof as well as the coating conditions are coordinated to insure that the particles retain a sufficient charge to effect the electrophoretic coating. Thus, in some cases, for example, in coating a support with larger particles (for example larger particles in the form of a catalyst support or a catalyst), the coating mixture may include an appropriate sol, all or a portion of which adheres to the larger particles to provide a sufficient charge and/or binding properties for producing a particulate coating in accordance with the invention.

It is to be understood that, within the scope of the invention, the particulate material which is applied as a coating may be particles larger than a sol, which larger particles may be applied as a coating with or without the addition of a sol, preferably with the addition of a sol.

In some cases, it may be desirable to treat the product prior to coating thereof to facilitate coating thereof and/or to improve adherence of the coating; for example, acid etching or gas treatment with an oxygen containing gas.

In a preferred embodiment, the particles which are applied to the three dimensional network of porous material may be catalyst particles or a catalyst support and/or a catalyst support containing active catalyst or precursor and/or a catalyst precursor. In such an embodiment, the particles preferably form a uniform coating over a defined thickness of the interior of the three dimensional network of material, with such three-dimensional network of material being porous (having a void volume), and with the coating of particles on such material also being porous. In this manner, it is possible to provide an overall catalyst structure in which there is a high void volume and wherein catalyst is uniformly distributed through a defined thickness of the interior of the three dimensional network.

In the case where the particles are in the form of a catalyst precursor, the product, after the deposit of the particles, is treated to convert the catalyst precursor to an active catalyst. In the case where the particles which are deposited in the three dimensional network of material is a catalyst support, active catalyst or catalyst precursor may then be applied to such support, e.g., by spraying, dipping, or impregnation.

Catalytically active material or precursors can be manyfold. For example, as representative but non limiting examples the catalytically active material may comprise one or more of Group VIB, VIIB, VIII catalytically active metals, metal oxide or sulfides and mixtures thereof and optionally including activators such as phosphorous, halogen or boron or such Group VIB, VIIB, VIII catalytically active metals, metal oxides or metal sulfides or metal nitrides and optionally including activators such as phosphorus, halogen or boron and mixtures thereof deposited on a refractory metal oxide base such as alumina, silica, silica/alumina, titania, zirconia, etc. and mixtures thereof, and alumina-silicate such as natural or synthetic zeolites such as zeolite X, zeolite Y, zeolite beta, ZSM-5, offretite, mordenite, erronite, etc. and mixtures thereof. Oxides like alumina, zeolites, zirconia, silica, titania-phases, vanadia-phases, transitionaluminas, zinc-phases, can be deposited directly from suspensions e.g., as nano- or micrometer particles or from sols of said compounds or from mixtures of both. Coated particles may include carbon supports, such as carbon black, oxidized carbon supports, carbon molecular sieves, etc., that are porous or non-porous. The concentration of the solid in the suspensions can vary between 0.01 and 80 wt. %

In general, the particles that are applied to the three dimensional material (catalyst, catalyst support, catalyst precursor) are inorganic particles.

In using a coating bath, the coating bath in some cases may include additional agents, such as stabilizers, binders, mobility enhancing agents, etc., and in some cases a single material may perform multiple functions in this respect. As representative stabilizing agents there may be mentioned: a polymer like polyacrylic acid, acrylamines, organic quarternary ammonium compounds, or other special mixes which are selected based on the particles that are to be coated.

By choosing the appropriate binder-/stabilizing agent, different materials can be co-deposited, which means they migrate simultaneously to the article to be coated and deposit simultaneously. The amount deposited is determined by the migration speed and the particle concentration in the system. Sols may also act as binders and/or stabilizing agents. The advantage of sols is that they are not pyrolyzed during subsequent heat treatment, which is used in most cases to achieve a proper bonding between the coating and the matrix. For example, to get a gamma-alumina coating with a very strong attachment between the oxide and the metal wire, alumina powder is suspended in an aqueous system and alumina sol is added to obtain, for example, a concentration between 1 and 30 wt. % alumina in such aqueous system. After the deposition, the article is dried and calcined. The dried and calcined sol is a good binder for alumina. In addition, during the coating process, the sol functions as a stabilizer and gives mobility to the alumina particles.

In preparing a catalyst in accordance with the invention, the catalyst may be applied to the support in a variety of ways.

In one embodiment, a particulate catalyst support may be applied to the support by electrophoretic coating in accordance with the invention, followed by application of a catalyst solution to the coated product; e.g., by spraying or impregnation.

In another embodiment, unsupported catalyst particles may be applied to a support in accordance with the invention.

In a further embodiment, a particulate catalyst support having catalyst or catalyst precursor applied thereto is coated onto the support in accordance with the invention.

In any of the above procedures, the electrophoretic coating may be accomplished with or without a binder added to the electrophoretic coating mix.

In a further embodiment, a binder may be applied to the three-dimensional network prior or subsequent to coating with a particulate material, with such binder preferably being applied by electrophoretic coating in accordance with the invention.

In yet a further embodiment, multiple coatings may be applied to the same product in multiple coating steps, which coatings may be the same or different from each other.

In still another embodiment during the electrophoretic coating, a material may also be applied to the non-particulate support in addition to the particulates being applied by electrophoretic coating.

These and other embodiments should be apparent by those skilled in the art from the teachings herein.

The product comprised of a three dimensional network of material has particles applied thereto by use of an electrophoretic coating or deposition process, which electrophoretic process may be of a type known in the art. It is unexpected that such known electrophoretic coating or deposition procedure could be effectively applied to both the interior and exterior of a product or support comprised of a porous three dimensional network of material (a product having a thickness) in that it would have been expected that the particles would be applied only to the exterior surfaces, rather than to the exterior and interior of such three dimensional network.

In accordance with the present invention, the product comprised of a three dimensional network of materials, is connected to the power supply as a positive or negative pole, depending on the charge of the particles which are to be applied to such product. The particles are employed in suspension in an appropriate liquid medium for application to the product or support. Thus, the product to which the particles are to be applied forms one of the poles or electrodes employed in the procedure.

The rate and amount of particles which is applied to the support and, therefore, the thickness of the coating may be controlled by controlling the current (which is determined by electrophoretic deposition parameters such as voltage and solid content of the suspension of particles employed in the procedure and additives) and the total time of the coating process.

After the coating procedure, the coated porous body is usually dried and, if required, one or more treatment steps can be carried out.

More particularly, the article to be coated is immersed into the coating suspension. Parallel to the geometric surface of the article, which is considered sheet-like, the electrodes are positioned. The electrodes may be comprised of a metal (e.g., stainless steel). Depending on the surface charge of the suspended particles, the article to be coated is the + or − pole (cathodic or anodic deposition). The deposition process is usually made under constant voltage, which depends on the geometry of the entire system (size/distance of the electrodes) and the properties of the suspension. Generally, the correlation is given by:

$I = n_2 * Q^2 / \eta * Uv/d$

I=current $n_2$=concentration of colloidal particles

Q=charge of colloidal particle $\eta$=viscosity of the colloidal system

U=voltage v=volume between the electrodes d=distance of the electrodes

After the deposition of the coating the article that has been coated is dried between 0° C. and 150° C. Subsequently a second heating step is performed to achieve a proper bonding of the coating onto the surface and to make the coating itself more stable against abrasion and other influences. The specific heating cycles and conditions are dependent on the coating. When sols are used, the heating cycle forms the appropriate crystallographic phase. An alumina-sol, for example, can be dried at 110° C. and treated afterwards at 550° C. in an inert or oxygen-containing atmosphere to form a transitional-alumina.

Thus, in accordance with the present invention, it is possible to apply a uniform coating to essentially all of the material for a defined thickness of the interior portion of the porous three-dimensional network. For example, if such three-dimensional network is comprised of fibers or wires or mixtures thereof, each of the fibers or wires in the defined thickness can be coated with such particles in a uniform manner.

Although, in a preferred embodiment, essentially the entire thickness of the material is coated with the particles, it is within the spirit and scope of the invention to coat less than the entire thickness with such particles. It is also possible within the spirit and scope of the present invention to have various coating thickness within the three dimensional structure.

As hereinabove indicated, the aspect of the present invention wherein larger particles are more effectively electrophoretically coated onto a support or product by the use of a sol or colloid is applicable to electrophoretic coating of nonporous supports wherein essentially only the exterior is coated as well as to the coating of porous supports wherein both the interior and exterior are coated.

The invention further relates to a catalytic reactor wherein the reactor contains at least one fixed bed of catalyst comprised of a coated, porous, three-dimensional product in accordance with the present invention.

The coating of the porous, three-dimensional product includes an appropriate catalyst. All or a portion of the coating is applied to the product or support by an electrophoretic procedure as hereinabove described wherein the coating which is applied electrophoretically is comprised of catalyst alone, or combination of catalyst and support or support and in the case where only the catalyst support is applied by electrophoretic coating, the catalyst is subsequently applied by another procedure, e.g. spray-coating or dipping or impregnation.

The void volume of the coated product is preferably at least 45%, and is preferably at least 55%, and is more preferably at least 65%. In general, the void volume does not exceed 95%, and preferably does not exceed 90% The term "void volume" as used herein is determined by dividing the volume of the coated product which is open (free of catalyst and material forming the mesh) by the total volume of the coated product (openings, mesh material and coating) and multiply by 100.

The reactor contains at least one catalyst bed, and such catalyst bed may be formed from one or more layers of coated product in accordance with the invention. In most cases, the catalyst bed is comprised of multi-layers of such coated product.

The coated product, in accordance with the present invention, may be formed into a wide variety of shapes and, therefore, may be employed as a packing element for a catalytic reactor. Thus, for example, the mesh may be fabricated into corrugated packing elements, wherein each corrugated packing element which forms the fixed catalyst bed is formed of the coated product. The catalyst bed can be formed from a plurality of such corrugated elements, and the elements may be arranged in a wide variety of shapes and forms.

In accordance with another aspect of the present invention, there is provided a catalyst structure that is comprised of a plurality of layers of fibers (the layers form a three dimensional network of material), with the fibers being randomly oriented in said layers, with the fibers being coated with a porous particulate coating wherein the particulate coating is applied to the fibers in a particulate form.

Thus, in producing the catalyst structure the particulate comprising the catalyst or a catalyst precursor or a catalyst support (the catalyst support may or may not include a catalyst or catalyst precursor) is applied to the fibers during the coating process in the form of particles.

In accordance with an aspect of the present invention, there is provided a process (and resulting product) for producing a catalytic structure that is comprised of a support structure that is coated with a particulate coating comprising a catalyst. The support structure is a porous mesh like structure comprised of multiple layers of randomly oriented fibers wherein the fibers in the interior of the mesh like structure and the fibers on the exterior portion of the mesh-like structure are coated with the particulate coating. In accordance with the present invention the particles of the particulate coating are in the form of particles when being applied to the fibers.

Thus, in accordance with an aspect of the present invention, there is provided a porous non-particulate support comprised of a plurality of layers of fibers, that are preferably randomly oriented, in which the fibers of the multilayers are coated with a particulate coating comprising a catalyst wherein the particles of the coating are applied to the fibers as particles.

The particles that are applied as a coating may be (i) a catalyst support that may or may not include a catalyst or catalyst precursor or (ii) a catalyst or (iii) a catalyst precursor.

In the case where the particles are a catalyst support that does not contain a catalyst, catalyst may be added to the support particles coated on the fiber. In the case where the particles are or include a catalyst precursor or where the particles are a catalyst support that contain a catalyst precursor, the catalyst precursor is converted to a catalyst by procedures known in the art.

The fibers used in the catalyst structure may be of the type as hereinabove described and the resulting catalyst structure may also have the properties (void volume etc.) as hereinabove described.

The support structure used in this aspect of the invention is comprised of a plurality of layers of randomly oriented fibers and, therefore, is not and is different from woven mesh structures used in the prior art. In particular, woven mesh structures include a single layer of material.

Thus, in accordance with an aspect of the present invention, there is provided a three-dimensional catalyst support, or packing, for a catalytic reactor, wherein the support, or packing, is formed of a coated, porous, three-dimensional product which has the characteristics hereinabove described.

The use of a catalyst coated packing in a reactor, in particular a fixed bed reactor in accordance with the invention can provide one or more of the following improvements: low by-product formation (improved selectivity); higher volumetric activity per unit of reactor volume; enhanced catalyst life, minimization or elimination of back-mixing; lower pressure drop; improved mixing of reactants and/or products as liquids and/or gases; higher geometric surface area to volume ratio of the catalyst; improved mass and heat transfer; etc.

The catalytic reactor may be employed for a wide variety of chemical reactions. As representative examples of such chemical reactions, there may be mentioned hydrogenation reactions, oxidations, dehydrogenation reactions, catalytic or steam reforming, alkylation reactions, hydrotreating, condensation reactions, hydrocracking, etherification reactions, isomerization reactions, selective catalytic reductions, and catalytic removal of volatile organic compounds, etc.

In accordance with another aspect of the present invention, there is provided a process for electrophoretically coating a material in a manner which reduces the "edge effect" with respect to the coating on the material.

The "edge effect" is one in which the material being coated receives a thicker coating around the edges thereof than in other portions thereof; in particular, the center portions.

Although the ability to reduce the "edge effect," as described herein, has particular applicability to the electrophoretic coating of a three-dimensional material, as hereinabove described, the teachings of the present invention in this respect are also applicable to the electrophoretic coating of non-porous materials, wherein only the surface of the material is coated.

In accordance with this aspect of the present invention, the "edge effect" is reduced whereby the difference between the coating thickness around the edges of the coated material and other portions of the coated material is minimized; i.e., in the same plane, the coating thickness at the edge of the material is essentially equal to the coating thickness in other portions of the material.

In accordance with an embodiment of the present invention for reducing edge effect, such edge effect is reduced by electrophoretically coating the material in a manner such that the field lines between the electrode comprising the material to be coated, and the electrode or electrodes of opposite plurality which are adjacent to the electrode comprising the material to be coated are disrupted. Applicant has found that the edge effect can be minimized by disrupting or changing the field lines between the electrode comprising the material to be coated and the adjacent electrodes of opposite polarity such edge effect reduction may be accomplished without the use of a disrupting counter-electrode. Thus, in accordance with an aspect of the invention, the electrophoretic coating is accomplished by a procedure that employs non-homogeneous or non-uniform field lines.

In another embodiment, the edge effect in an electrophoretic coating process is minimized by electrophoretically coating a material in a manner such that the cross-section of the electrode comprising the material to be coated, and the electrode or electrodes of opposite polarity adjacent to the material to be coated, as well as the cross-section of the coating bath between such electrodes are essentially equal to each other. Thus, the shape and outer dimensions of such electrodes, and the shape and outer dimension of the coating bath between such electrodes are essentially equal to each other. Applicant has found that the use of such dimensions reduces the edge effect.

In accordance with another embodiment, the distance between the electrode comprising the material to be coated, and the electrodes of opposite polarity adjacent to the electrode comprising the material to be coated is selected to be at a value which minimizes the edge effect during such electrophoretic coating. Applicant has found that by reducing the distance between such electrodes, the edge effect can be reduced. In a preferred embodiment, the distances between the electrode comprising the material to be coated, and the electrodes of opposite polarity adjacent to such electrode, is less than 100 mm and, in general, is no less than one millimeter.

In another embodiment, a dielectric material is placed between the electrode comprising the material to be coated and the electrodes of opposite polarity adjacent thereto. Such dielectric material has an opening therein and the dielectric constant thereof is different than that of the suspension in the coating bath. Preferably, the dielectric constant of such dielectric material is at least ten times greater than the dielectric constant of the suspension in the coating bath.

The opening or openings in the dielectric material generally comprises from 10% to 90% of the area of the dielectric material. In particular, the size or area of the opening or plurality of the openings is less than the size or cross-sectional area of the material to be coated.

In yet a further embodiment, the electrophoretic coating is effected in a manner such that the electrodes adjacent to the electrode comprising the material to be coated, and having a polarity opposite thereto, is comprised of a polarity of separately spaced electrodes, each of which is smaller than the electrode(s) comprising the material to be coated. Thus, in effect, the electrodes having a polarity opposite to that of the electrode comprising the material to be coated, which is adjacent to the material to be coated, is each comprised of a plurality of pin-like electrodes, anchored or placed in a dielectric material, with the pin electrodes being spaced from each other. Such pin electrodes create a non-homogeneous or disrupted electric field which improves the uniformity of the electrophoretic coating; i.e., reduces edge effects.

It is contemplated within the present invention that a combination of the hereinabove-described techniques for reducing the edge effect may be employed. Thus, two or more of such techniques may be employed to improve the uniformity of the coating. In this respect, for example, in using the technique wherein the dimensions of the electrodes, as well as the bath between the electrode have essentially identical dimensions, the distance between the electrodes is selected to minimize the distance between the material to be coated and the electrode of opposite polarity adjacent thereto thereby improving the uniformity of the coating. Similarly, in some cases, the above two techniques may be combined with the use of a dielectric material between adjacent electrodes having an appropriate opening therein.

When employing a dielectric material with appropriate openings, the uniformity of the coating thickness can be manipulated to provide a wide variety of coating thickness differences. Thus, it is possible to control the openings in such dielectric material such that the center portions of the material being coated have a greater coating thickness than the edge portions, and vice versa. However, in a preferred embodiment, by appropriately controlling the opening(s) in the dielectric material, it is possible to reduce the edge effect and to obtain a uniform coating over the cross-sectional area, in a given plane, of the material which is coated.

The drawings illustrate embodiments of the invention, wherein.

Figure 1:
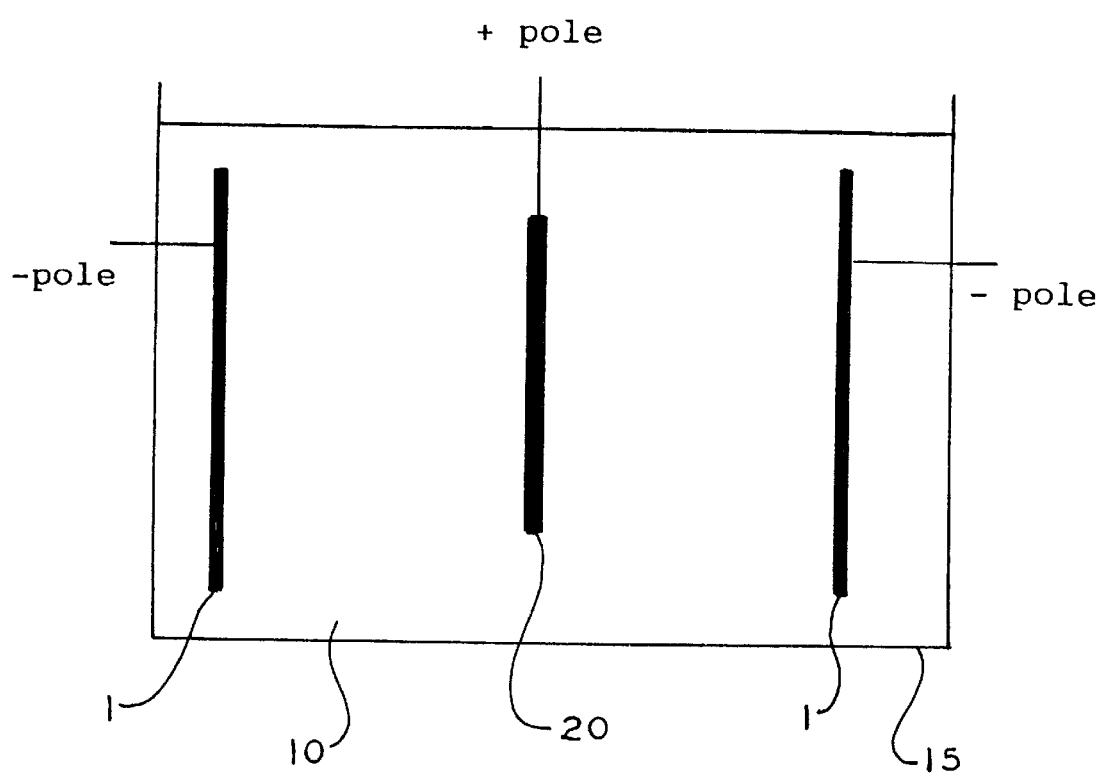
FIG. 1 is a simplified schematic of an electrophoretic coating apparatus.

An example for a deposition apparatus is given in FIG. 1. The electrodes (1) made of an electronically conducting sheet (e.g. stainless steel) are immersed in the colloidal fluid (10), which is all inserted in a container (15). The article to be coated by the colloidal particles is placed between the two electrodes. The geometry of the arrangement can be varied, so that one electrode or more than two electrodes are used. The article to be coated (20) can be placed between two electrodes (1) or opposite to a single electrode or between an arrangement of more than two electrodes.

Figure 2:
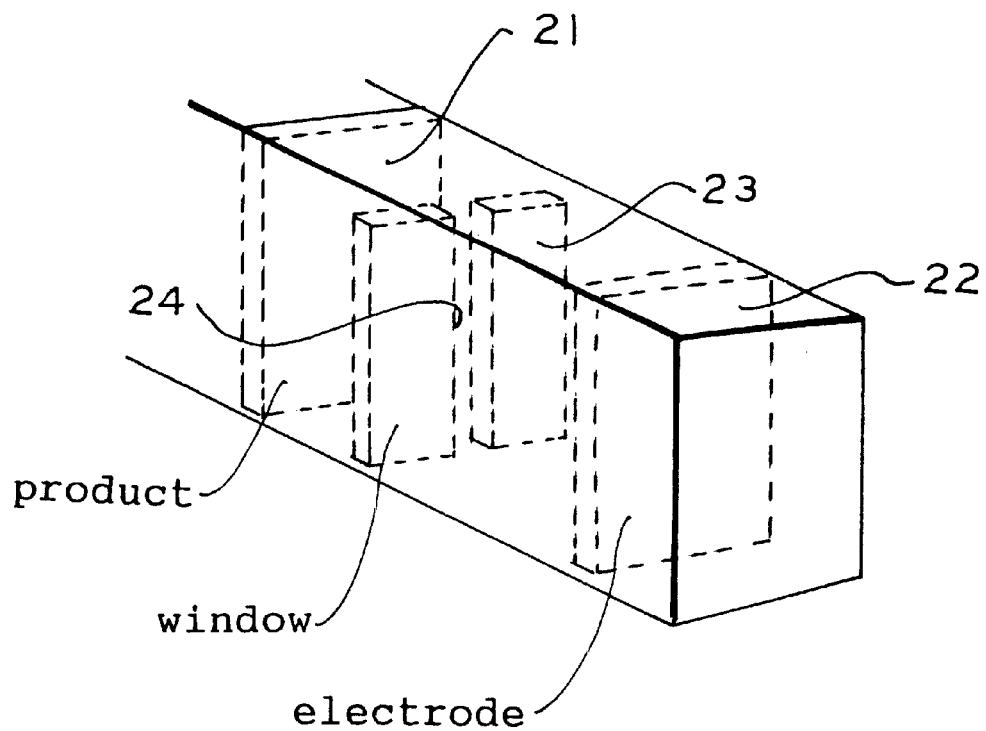
FIG. 2 is a simplified schematic of an electrophoretic costing apparatus with means for reducing edge effects.

There is shown in FIG. 2 a schematic representation of a coating unit, which includes a dielectric material between the electrode comprising the product to be coated and the electrode of opposite polarity. As shown in FIG. 2, the product electrode is 21, the electrode of opposite polarity is 22, and the dielectric material is 23, which includes a slit opening 24. Although a dielectric material with a slit opening is shown, as hereinabove indicated, other openings in the dielectric material are possible within the scope of the present invention. For example, the opening may be a square or rectangular opening, or a plurality of openings in the dielectric material.

Figure 3:
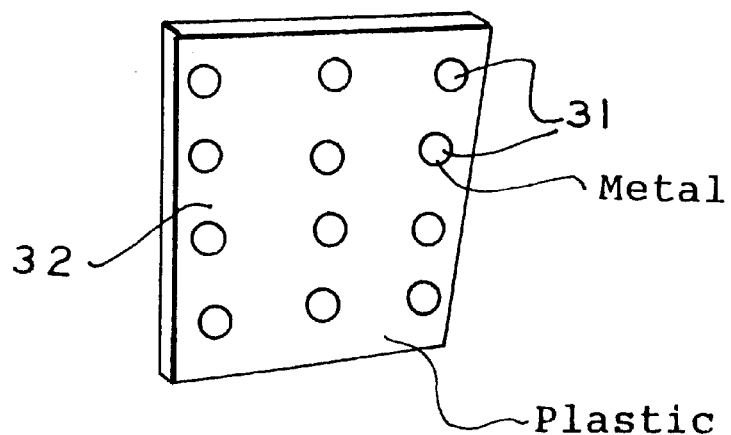
FIG. 3 is a simplified schematic of an electrode for reducing edge effects

Referring to FIG. 3, there is shown an electrode wherein the electrode is comprised of a plurality of separate and distinct electrodes, which are used as an electrode having a polarity opposite to the electrode comprising the material to be electrophoretically coated. As shown in FIG. 3, such an electrode is comprised of a plurality of pin-like electrodes 31 in a dielectric material 32.

Figure 4:
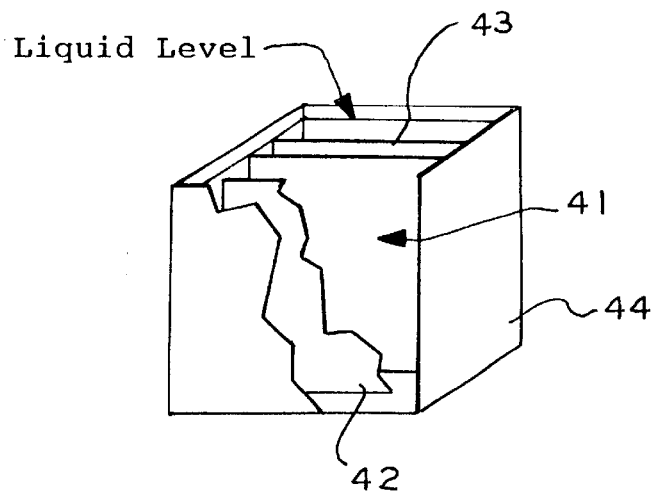
FIG. 4 is a simplified schematic of an electrophoretic coating apparatus for reducing edge effects.

In FIG. 4, there is shown a schematic representation of an electrophoretic coating design wherein the electrode comprising the material to be coated, the electrodes of polarity opposite thereto, and the coating bath between the electrodes have essentially the same dimension. As shown in FIG. 4, the electrode comprising the material to be coated is designated as 41, and the two electrodes of opposite polarity are designated as 42 and 43. As shown, the electrodes 41, 42 and 43 have essentially the same dimensions, and the height and width of the tank 44 for holding the electrophoretic coating material 46 is such that the level of the electrophoretic coating material in the tank may be maintained essentially equal to the height of the electrodes.

As hereinabove indicated, the techniques for reducing edge effect of the present invention has particular applicability to the coating of a porous, three-dimensional network of material by electrophoretic coating in a manner such that in addition to the exterior of the material at least a portion of the interior of such three-dimensional network is coated. However, such techniques may also be employed for coating the surface of non-porous materials.

In a preferred but not limiting embodiment of the invention, electrophoretic coating is effected in a manner such that the distance between the sheet and each electrode of opposite polarity is 50 mm. The size of the electrode, the specimen and the cross-section of the bath is 30×30 cm. In this respect, such an arrangement may be accomplished by the use of a holder which positions the sheet to be coated the desired distance from the other electrode. The sheets are fixed in a container box, which is mobile. The container is inserted in coating units and drying units. The movable container is equipped with the electrodes with a design that allows a "self-positioning by gravity" (distance holders) of the mesh-sheets. The electrical contacts are guided through the distance holders, so that no external electrical contacting is necessary. This makes the process easy to handle, reliable and allows simple automation.

Figure 5A:
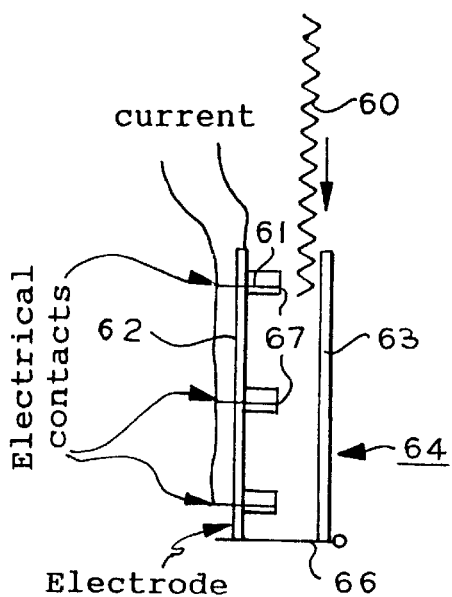
FIG. 5 is a simplified schematic of an electrophoretic coating apparatus that includes means for locating the material to be coated.
Figure 5B:
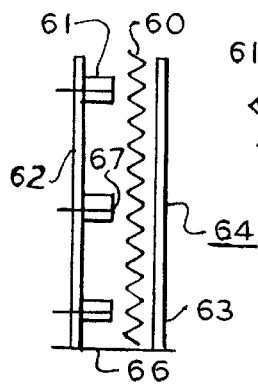
Figure 5C:
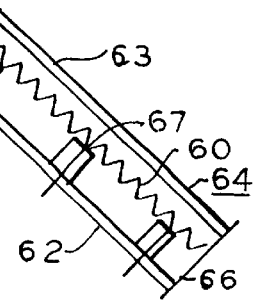

Referring to FIG. 5, there is shown a container or cell 64 comprised of a first wall in the form of an electrode 62, a second wall in the form of an electrode 63 and a bottom non-conducting wall 66. As shown in FIG. 5, the sheet 60 to be coated is put into the deposition container 64 (FIG. 5a); and the sheet 60 rests "unlocated" in the deposition cell or container 64 (FIG. 5b). The container 64 is tilted to an angle of 45° (FIG. 5c) and the sheet 60 falls on the distance holders 61 which include an electrode 67 that is of a polarity opposite to both electrodes 62 and 63.

The electrical current transport during the electrophoretic deposition is governed by the charge transport by the colloidal particles and by ionic transport. The latter is undesired, because this is a current transport without any benefit. Due to this the concentration of ions should be kept on a minimum.

The invention will be further described with respect to the following examples; however, the scope of the invention is not to be limited thereby:

EXAMPLE 1

Configuration and Process to Incorporate Gamma Alumina Onto and Into a Sheet of Metal Felt The tank contains an alumina sol with particle size ranging from 1 to 60 nm, preferred 10–30 nm. The system is stabilized to establish a sufficiently long shelf life by addition of nitric acid or acetic acid. Aqueous solutions are preferred because such systems are easy to handle. The solid concentration of alumina in the sol is between 1 and 30 wt. %, preferred 5–10 wt. %. Positive electrodes of stainless steel plates are preferred while the negatively charged electrode is the article to be coated, which may consist for example of a 1 mm thick metal felt made of 20 micron thick metal fibers with 90% void volume and an average void-opening of 20 micron. The article to be coated has a size of 10 by 10 cm. For deposition, a current is applied, a voltage between 10 and 20 V and a current between 0.1 and 100 mA per $cm^2$ specimen-surface, preferred 10–40 mA per $cm^2$ surface. After 1–10 minutes of deposition, the specimen is removed from the tank, dried to evaporate water and sintered afterwards (e.g. a temperature of 500° to 550° C. for 1 to 3 hours, preferably 500° C. for 1 hour) to form gamma aluminum oxide that is properly bonded to the metal surface and has the appropriate active surface between 100 and 300 $m^2/g$. Depending on the concentration, the current and the deposition time alumina-loads up to 30% can be incorporated in the metallic felt.

EXAMPLE 2

Co-deposition of Sol and Particles

Suspensions of micrometer-particles exhibit an electrophoretic mobility and the solid particles migrate into the fiber-network of the article to be coated. Such micrometer sized particles which have a size of preferred 0.5–10 micron can be titania, alumina, zeolite or any other compound. Depending on the nature of the particles, it is possible to improve the attachment of the particles on the metallic wire surface by co-depositing the particles together with a sol. The sol acts as an adhesive that connects the particles to the fiber-surface and to each other. The process starts with a stable suspension of micron particles that contains a sol (nano-particles) with a concentration ranging from below 1% up to 20% or even higher. Subjecting the suspension/sol-mix the electrophoretic deposition results in a migration of both, the nano-particles (i.e., sol) and the micrometer particles, towards the fiber-network. A co-deposition onto the surface of the fibers takes place. As a result, the micrometer-particles are more firmly attached onto the metal surface by the sol; after heating to temperatures higher than 100° C., the dried coating begins to solidify and the sol starts to form a crystalline state. The micron-particles are embedded in a porous thin film coating and are by this strongly attached to the metal.

The coated products of the present invention may be employed for a wide variety of applications, including, but not limited to, use as a catalyst, separation membranes, packing (non-catalytic or catalytic) for columns, in particular distillation columns; sensors; separation devices other than membranes; adsorbents for adsorption columns. These and other uses should be apparent to those skilled in the art from the teachings herein.

EXAMPLE 3

Coating with Eliminated Edge Effect

A coating deposition cell contains two plate like stainless steel electrodes with the same geometry as the cross section of the bath: 30 cm by 30 cm. The distance of the electrodes from each other is 100 mm.

Water and an alumina sol-binder (40 nm) are mixed: the amount of sol-binder is governed by the total amount of aluminum oxide (<3 microns) of oxide powder, which is in this example 10 wt. %. The amount of sol-binder is 2 wt. % of the amount of the solid powder. This mix is vigorously stirred and 1 wt. % (related to the amount of oxide powder) of quaternary amine is added. Then the pH is adjusted by adding diluted nitric acid to pH 4–4.5. Finally the aluminum oxide (<3 microns) powder is added step by step while the suspension is stirred further.

After transferring the suspension to the deposition unit, a fiber mesh sheet (30 cm×30 cm), that has been annealed at 300 C. for 1 h is inserted at the middle plane between the two electrodes. A potential of 10 V is applied across the electrodes and the fiber mesh. A deposition time of 60 seconds is sufficient to load the interior of the fiber mesh structure with 25 wt. % oxide powder.

After the deposition is made the mesh is removed from the bath, the adhering drops are blown off by an air-blower and dried by a hot air stream. The final step is the sintering at 500 C. for 1 h in air.

Numerous modifications and variations of the present invention are possible in light of the above teachings and therefore, within the scope of the impended claims, the invention maybe practiced otherwise not as particularly described.

What is claimed is:

1. A catalyst, comprising:
   a catalyst coated as a particulate coating on a porous mesh-like structure, said porous mesh-like structure comprising a plurality of layers of fibers that are oriented randomly, said fibers having a diameter of less than 100 microns, said catalyst comprising a mixture of larger and smaller particles as a particulate coating wherein the larger particles have an average particle size of at least 0.5 microns and no greater than 20 microns, and the smaller particles have a particle size of less than 150 nanometers and are present in an amount of at least 0.1% by weight, based on the amount of said larger and smaller particles in the mixture, said mesh-like structure coated with the catalyst having a void volume of at least 55%.

2. The catalyst of claim 1 wherein said mesh-like structure coated with the catalyst has a void volume of at least 65%.

3. The catalyst of claim 2 wherein said mesh-like structure coated with the catalyst has a void volume of no greater than 95%.

4. The catalyst of claim 3 wherein said mesh-like structure coated with the catalyst has a void volume of no greater than 90%.

5. The catalyst of claim 1 wherein said catalyst comprises a catalyst supported on a particulate support.

6. The catalyst of claim 1 wherein said smaller particles have a particle size of at least 2 nanometers.

7. The catalyst of claim 6 wherein said smaller particles have a particle size of from 20 nanometers to 40 nanometers.

8. The catalyst of claim 1 wherein said larger particles have an average particle size of at least 1.0 micron.

9. The catalyst of claim 1 wherein said fibers have a diameter of less than 30 microns.

10. A catalytic reactor, comprising:

at least one catalyst bed comprising a catalyst, said catalyst comprising a catalyst coated as a particulate coating on a porous mesh-like structure, said porous mesh-like structure comprising a plurality of layers of fibers that are oriented randomly, said fibers having a diameter of less than 100 microns, said catalyst comprising a mixture of larger and smaller particles as a particulate coating wherein the larger particles have an average particle size of at least 0.5 microns and no greater than 20 microns, and the smaller particles have a particle size of less than 150 nanometers and are present in an amount of at least 0.1% by weight, based on the amount of said larger and smaller particles in the mixture, said mesh-like structure coated with the catalyst having a void volume of at least 55%.

11. The reactor of claim 10 wherein said mesh-like structure coated with the catalyst has a void volume of at least 65%.

12. The reactor of claim 11 wherein said mesh-like structure coated with the catalyst has a void volume of at least 95%.

13. The reactor of claim 12 wherein said mesh-like structure coated with the catalyst has a void volume of no greater than 90%.

14. The reactor of claim 10 wherein said catalyst comprises a catalyst supported on a particulate support.

15. The reactor of claim 10 wherein said smaller particles have a particle size of at least 2 nanometers.

16. The reactor of claim 5 wherein said smaller particles have a particle size of from 20 nanometers to 40 nanometers.

17. The reactor of claim 10 wherein said larger particles have an average particle size of at least 1.0 micron.

18. The reactor of claim 10 wherein said fibers have a diameter of less than 30 microns.

* * * * *